United States Patent Office 3,651,215
Patented Mar. 21, 1972

3,651,215
BACTERIAL MOSQUITO LARVA-KILLING AGENT

Satohiro Ibuki and Nobuo Fujiyoshi, Saitama-ken, Japan, assignors to Juro Morita, Tokyo, Japan No Drawing. Continuation-in-part of application Ser. No. 620,268, Mar. 3, 1967. This application Aug. 12, 1968, Ser. No. 751,750
Int. Cl. A01n *15/00*
U.S. Cl. 424—93 8 Claims

ABSTRACT OF THE DISCLOSURE

The present bacterial mosquito larva-killing agent comprises spores of *Bacillus cereus* var. *juroi* ATCC 21281 as an active ingredient and has a positive toxic effect only on mosquito larvae and is quite non-toxic to humans, cattle and fish.

The sufficiently effective spore concentration of the mosquito larva-killing agent is $10^{10}$ to $10^{11}$ spores per gram of the agent, and the agent can be used directly or in combination with a filler, emulsifier, or oleaginous liquid in any form such as powders, tablets, capsules or aqueous emulsions.

This application is a continuation-in-part of copending application Ser. No. 620,268, filed on Mar. 3, 1967, now abandoned.

This invention relates to a bacterial mosquito larva-killing agent, more particularly, a bacterial mosquito larva-killing agent showing a positive toxic effect on mosquito-larvae and yet being quite non-toxic to humans, cattle and fish.

Chemical insecticides have been so far used to kill such sanitary insect pests as flies and mosquitoes. However, such chemical insecticides not only elevate the resistance of insect pests to the insecticides until it is so high as to reduce the effect of the insecticides, but can also be very detrimental to humans, cattle, fish and useful insects. Therefore, the use of such insecticides has become increasingly suspect. Thus there has been recently, and it is to be expected that there will be in the future, much research on the utilization of natural enemies to take the place of conventional chemical insecticides. In Europe and America microbial insecticides composed mostly of *Bacillus thuringiensis* and showing a toxic effect on general agricultural and forest insect pests have been used in practice. (For example, see A. Krieg: *Bacillus thuringiensis* Berliner, Berlin, 1961.) However, no great effect on sanitary insect pests can be expected from the natural enemies of agricultural and forest insect pests. Now, as a result of our hard efforts for the selection of bacteria which are non-toxic to humans, cattle, poultry and fish and yet which show a high and long-lasting toxic effect selectively on sanitary insect pests, the present inventors have succeeded in isolating *Bacillus cereus* var. *juroi* ATCC 21281 showing a selective killing effect upon mosquito larvae from farm soils in Iruma-gun, Saitama Prefecture, Japan, and have invented a novel bacterial insecticide for killing mosquito larvae.

Bacteriological properties of *Bacillus cereus* var. *juroi* ATCC No. 21281 are given below:

Gram positive, aerobic sporeformer, motile.
Actylmethylcarbinol produced.
Acid from glucose.

No acid from arabinose, xylose, lactose and mannitol.
No acid from saccharose and glycerol.
Lecithinase not produced.
Citrates utilization variable.
Pathogenic for mosquito larvae.
Not toxic to mice.

FORM

Rods of 0.7 x 2.5–2.7 microns.
The sporangia are not definitely swollen.
The spores are ellipsoidal, 0.4 x 2.0 microns (paracentral).

Comparison of the bacteriological properties of *Bacillus cereus* var. *juroi* ATCC No. 21281 with other microorganisms belonging to the genus Bacillus described in "Bergey's Mannual of Determinative Bacteriology, 7th edition," etc., reveals its similarity to *Bacillus cereus,* as shown in Table 1.

TABLE 1

| Bacillus sp. | I | II | III | IV | V |
|---|---|---|---|---|---|
| *B. megaterium* | − | + | + | + | − |
| *B. pumilus* | + | ------ | + | + | − |
| *B. badius* | − | ------ | − | − | − |
| *B. firmus* | − | − | ------ | ------ | + |
| *B. lentus* | − | − | + | ------ | − |
| *B. macerans* | − | − | + | + | + |
| *B. stearothermophilus* | − | − | ± | ------ | − |
| *B. circulans* | − | − | + | ------ | ± |
| *B. laterosporus* | − | − | − | + | + |
| *B. pulvifaciens* | − | − | ------ | + | + |
| *B. brevis* | − | ± | − | + | ± |
| *B. pathothenticus* | − | ± | − | − | ± |
| *B. sphaericus* | − | − | ------ | ------ | − |
| *B. pasteurii* | − | ------ | ------ | ------ | + |
| *B. cereus* | + | + | − | − | + |
| *B. subtilis* | + | + | + | + | + |
| *B. coagulans* | + | − | ± | ± | − |
| *B. polymyxa* | + | − | + | + | + |
| *B. alvei* | + | − | − | − | − |
| *Bacillus cereus* var. *juroi* ATCC 21281 | + | ± | − | − | + |

I: Acetylmethylcarbinol produced.
II: Citrates utilized.
III: Acid from arabinose and xylose.
IV: Acid from mannitol.
V: Nitrites produced from nitrates (± shows a variability).

The species of the present microorganism is morphologically, biochemically similar to *Bacillus cereus* and thus has been determined to belong to the species *Bacillus cereus.* It is found that the present microorganism has a peculiar pathogenic nature for mosquito larvae, as shown in Table 2. Further, it is found that there are slight differences in its bacteriological properties, as shown in Table 3. Thus, the present microorganism was deemed a new variant species of *Bacillus cereus* and accordingly named *Bacillus cereus* var. *juroi.*

TABLE 2

| *Bacillus cereus* strains | Number of inoculated larvae | Number of produced adults | Percent effectiveness |
|---|---|---|---|
| *B. cereus* (SCC 01) [a] | 50 | 47 | 0 |
| *B. cereus* (SCC 06) | 50 | 48 | 0 |
| *B. cereus* (SCC 13) | 50 | 45 | 4.3 |
| *B. cereus* (SCC 26) | 50 | 42 | 10.6 |
| *B. cereus* (SCC 32) | 50 | 46 | 2.1 |
| *B. cereus* (IAM 1208) [b] | 50 | 46 | 2.1 |
| *B. cereus* (var. *juroi*) ATCC 21281 | 50 | 0 | 100 |
| Control | 50 | 47 | --------- |

[a] SCC: Seibu Culture Collection.
[b] IAM: Institute of Applied Microbiology, Tokyo Univ.
Concentration of spores: 5×10⁷ spores/ml. of larval medium.

TABLE 3

| Item | | Bacillus cereus | Bacillus cereus var. juroi ATCC 21281 |
|---|---|---|---|
| Physiological properties | Saccharose utilization | + | − |
| | Glycerol utilization | + | − |
| | Lecithinase reaction | + | − |
| | Citric acid utilization | + | ± |
| Pathogenicity | Pathogenicity on mosquito larvae | − | ++ |

Relation between the toxicity on mosquito larvae and concentration of the present *Bacillus cereus* var. *juroi* ATCC 21281 is given in Table 4.

TABLE 4

| Concentration of spores per ml. of larval medium | Number of inoculated larvae | Number of produced pupae | Number of produced adults | Percent effectiveness |
|---|---|---|---|---|
| $2 \times 10^6$ | 50 | 0 | 0 | 100 |
| $4 \times 10^5$ | 50 | 0 | 0 | 100 |
| $2 \times 10^5$ | 50 | 0 | 0 | 100 |
| $7 \times 10^4$ | 50 | 0 | 0 | 100 |
| $5 \times 10^4$ | 50 | 3 | 3 | 92 |
| $2 \times 10^4$ | 50 | 16 | 14 | 62 |
| $2 \times 10^3$ | 50 | 37 | 30 | 30 |

NOTES: (1) Sample mosquitoes: *Culex pipiens* Coquillett.
(2) Number of eating days: 2 days.

As shown in Table 4, it is desirable that the concentration of spores per ml. of the larval medium is about $5 \times 10^4$ spores, or more.

It is necessary in the present invention to make the mosquito larvae eat the present bacterial insecticide.

The toxic substance of the bacterial insecticide of the present invention on mosquito larvae is not yet completely clear. However, it is considered to be due to bacteria (endotoxin) from the fact that, when young larvae of mosquitoes eat the bacterial spores of this insecticide for only 2 days, substantially all of them will die. This toxin in the bacteria is characteristic of *Bacillus cereus* var. *juroi* ATCC 21281 according to the present invention.

In order to exemplify it, the toxicity on mosquito larvae of *Bacillus cereus* var. *juroi* ATCC 21281 according to the present invention is compared with toxicity of the typical insect pathogenic bacteria, *Bacillus thuringiensis* and fly pathogenic bacteria, *Bacillus moritai* ATCC 21282 in the following Table 5.

TABLE 5

| Strains | Concentration of spores/ml. | Number of inoculated larvae [a] | Insecticidal rate, percent |
|---|---|---|---|
| *Bacillus cereus* var. *juroi* ATCC 21281 | $7 \times 10^4$ | 100 | 100 |
| *Bacillus moritai* [b] ATCC 21282 | $2 \times 10^6$ | 100 | 19 |
| *Bacillus thuringiensis* [c] | $7 \times 10^7$ | 100 | 10 |

[a] Sample mosquitoes: *Culex pipiens* Coquillett.
[b] U.S. patent copending application Ser. No. 753,874.
[c] The results of tests of *Bacillus thuringiensis* are taken from J. Insect. Pathol., 2, pp. 306 (1960).

The present invention is to provide a bacterial insecticide comprising spores of *Bacillus cereus* var. *juroi* ATCC 21281 as an active ingredient.

The spores of *Bacillus cereus* var. *juroi* ATCC 21281 are obtained in the following manner: Propagation, culturing and spore formation of the present bacteria are carried out in a culturing medium containing a sufficient carbon source such as molasses, date or glucose nitrogen source such as corn steep liquor, meat extract or peptone, and growth factors such as biotin or thiamine and being appropriate for spore formation by the ordinary aerated, submerged culturing method.

The culturing is carried out at 20–35° C., preferably 27° C., and at a starting pH of 7–8 for 25–30 hours. The final whole culture is dried by spray or freezing-vacuum after centrifugal separation by means of a Sharples centrifuge or the like, or not, and further dried and properly pulverized to obtain a stability of spore activity, whereby the dried powders of bacteria consisting mainly of spores or final whole culture containing the spores can be obtained.

The thus obtained dry powders of bacteria consisting mainly of spores or final whole culture can be directly used for killing the mosquito larvae by spraying the same to the places where the larvae live. Furthermore a filler can be added to the thus obtained dry powders of bacteria consisting mainly of spores or final whole culture. A sufficiently effective spore concentration of the product insecticide is $10^{10}$ to $10^{11}$ spores per gram.

The filler itself, that is, powders of inactive substance, is well known and is not novel as an ingredient for the present bacterial insecticide. As the powders of inactive substances, such mineral powders as bentonite, kaolin, talc, zeolite, alumina, diatomaceous earth, calcium carbonate, marble powder or lime powder, or volcanic ashes can be added to the dry powders of bacteria consisting mainly of spores or final whole culture.

In preparing the insecticide by mixing the dry powders of bacteria consisting mainly of spores or final whole culture with the filler, the insecticide can be offered in various forms such as aqueous emulsion, tablets, capsules or other forms in addition to the powdery form.

In the case of an encapsulated insecticide, the dry powders of bacteria consisting mainly of spores are encased in water-soluble capsules. A simple killing method based on spraying the capsuled insecticides at the places where the mosquito larvae live is possible also in that case.

In the case of an emulsified-insecticide, the ordinary oleaginous liquid such as xylene, kerosene, corn oil or whale oil, and such emulsifying agents as anionic surface active agents, i.e. salts of higher alcohol sulfate ester and alkylaryl-sulfonates; cationic surface active agents, i.e. aminoethylimidazolines and quaternary ammonium salts; and non-ionic surface active agents, i.e. polyoxyethylene sorbitan alkyl esters and alkylaryl polyether alcohols, can be used in preparing the emulsified insecticide. In that case, the effect of the oleaginous liquid on the mosquito larvae can be expected in addition to the effect of the present active ingredient.

EXAMPLE 1

*Bacillus cereus* var. *juroi* ATCC 21281 is inoculated in a bouillon medium containing 1.0% meat extract, 1.0% peptone and 0.2% sodium chloride and having pH of 7.5 and culturing is conducted at 27° C. for 30 hours. Then, the cultured medium is centrifuged, whereby the spore-formed cells can be obtained in a slurry state. The thus obtained cells are dried and pulverized, whereby the dry powders of bacteria consisting mainly of spores are obtained.

A powdery insecticide is prepared by mixing one part by weight of dry powders of bacteria consisting mainly of spores and 99 parts by weight of kaolin powders (dry basis). The thus prepared insectide contains $2.3 \times 10^{11}$ spores per gram of the product insecticide.

EXAMPLE 2

*Bacillus cereus* var. *juroi* ATCC 21281 in inoculated in a medium containing 1.0% molasses, 1.0% corn steep liquor, 0.1% $KH_2PO_4$ and 0.05% $MgSO_4 \cdot 7H_2O$ and having a pH of 7.5, and culturing is conducted at 27° C. for 30 hours. The final whole culture containing spores is spray-dried with hot air of 60° C., whereby dry powders of final whole culture are obtained.

A powdery insecticide is prepared by mixing two parts by weight of dry powders of final whole culture and 98 parts by weight of diatomaceous earth (dry basis). The thus prepared insecticide contains $8.4 \times 10^{10}$ spores per gram of the product insecticide.

EXAMPLE 3

An aqueous emulsified insecticide is prepared by mixing 10 parts by weight of dry powders of bacteria consisting mainly of spores prepared in Example 1, 10 parts by weight of xylene, 0.5 part by weight of an emulsifier (Tween-80, a trademark of surfactant produced by Atlas Powder Co. U.S.A.) and 79.5 parts by weight of water. The thus prepared emulsified insecticide contains $2.0 \times 10^{12}$ spores per 1 ml. and is used after being diluted to 5 to 10 times the original volume with water.

The bacterial mosquito larva-killing agents prepared in the foregoing Examples 1, 2 and 3 have the killing effects, as shown in Table 6.

TABLE 6

| | Dosage per 100 ml. of mosquito larvae medium | Number of inoculated larvae | Number of produced pupae | Number of produced adults | Percent effectiveness |
|---|---|---|---|---|---|
| Example 1 | 0.1 g | 50 | 0 | 0 | 100 |
| Example 2 | 0.5 g | 50 | 0 | 0 | 100 |
| Example 3 | 1 ml | 50 | 0 | 0 | 100 |
| Control | 0 | 50 | 48 | 46 | |

Note: (1) Sample mosquitoes: *Culex pipines* Coquillett.
(2) Tests on killing effect only of the corresponding fillers of said Examples, which are free of the active ingredient, all show negative results.

The examples exemplified above are merely for illustration of the present invention, and the present invention is not limited thereto.

The essential feature of the present invention is to use the spores of *Bacillus cereus* var. *juroi* ATCC 21281 as an effective ingredient for killing mosquito larvae, singly or in combination with a suitable filler or carrier. Thus, any carrier can be used so long as the carrier will not perish or inactivate the activity of the spores.

Further, it is also possible to simultaneously use a chemical insecticide or an attractant for egg-laying which will not perish or inactivate the activity of the spores.

What we claim is:

1. A bacterial mosquito larva-killing agent comprising an effective mosquito larva-killing amount of spores of *Bacillus cereus* var. *juroi* ATCC 21281 as an active ingredient and a carrier.

2. A bacterial mosquito larva-killing agent according to claim 1 wherein $10^{10}$ to $10^{11}$ spores are contained in a gram of the killing agent.

3. A bacterial mosquito larva-killing agent according to claim 1, wherein the carrier is a mineral powder.

4. A bacterial mosquito larva-killing agent according to claim 1, wherein the carrier is an oleaginous liquid.

5. A bacterial mosquito larva-killing agent according to claim 1, wherein the mixture is in a capsuled form.

6. A bacterial mosquito larva-killing agent according to claim 1, wherein the mixture is in a tablet form.

7. A bacterial mosquito larva-killing agent according to claim 1, wherein said carrier is an inactive substance selected from the group consisting of bentonite, kaolin, talc, zeolite, alumina, diatomaceous earth, calcium carbonate, marble powder, lime powder and volcanic ashes.

8. A method for killing mosquito larvae which comprises an effective mosquito larva-killing amount of spores of *Bacillus cereus* var. *juroi* ATCC 21281 to said mosquito larvae.

References Cited

UNITED STATES PATENTS

| 3,337,395 | 8/1967 | Page | 424—93 |
| 3,271,243 | 9/1966 | Cords et al. | 424—93 |

OTHER REFERENCES

Stephens: Canada, J. Zool., 30, 30–40 (1952).
Heimpel et al.: Bacteriological Reviews, 24 (3), 266–269, September 1960.

JEROME D. GOLDBERG, Primary Examiner